United States Patent [19]

Okamoto

[11] Patent Number: 5,043,917

[45] Date of Patent: Aug. 27, 1991

[54] CONTROL METHOD AND APPARATUS THEREFOR

[75] Inventor: Osamu Okamoto, Fuchu, Japan

[73] Assignee: Japan Aviation Electronics Industry Limited, Tokyo, Japan

[21] Appl. No.: 362,132

[22] Filed: Jun. 6, 1989

[30] Foreign Application Priority Data

Jun. 24, 1988 [JP] Japan ............................... 63-157429

[51] Int. Cl.[5] ............................................. G06F 15/20

[52] U.S. Cl. ..................................... 364/518; 340/703

[58] Field of Search ................................ 364/518-521; 340/701, 703, 721, 723

[56] References Cited

U.S. PATENT DOCUMENTS 4,675831 6/1987 Ito et al. ............................ 364/518

4,683,466 7/1987 Holtey et al. ....................... 340/703

4,723,226 2/1988 McDonough et al. ......... 340/799 X 4,745,462 5/1988 Dischert et al. ................ 340/798 X 4,821,208 4/1989 Ryan et al. ......................... 364/518

4,825,390 4/1989 Van Aken et al. ............. 364/518 X

*Primary Examiner*—Heather R. Herndon

*Attorney, Agent, or Firm*—Pollock, Vande Sande and Priddy

[57] ABSTRACT

Bit map memories, which have addresses corresponding to orderly-arranged red, green and blue dots of a color display panel, are provided corresponding to red, green and blue colors, respectively, and a color array memory is provided which has prestored data indicating the array of the colors of the dots in at least one dot area of the color display panel. Bit map data are simultaneously read out of the three bit map memories in the order of arrangement of the dots of the color display panel, and the bit map data thus read out are input into a color selector. In synchronization with this data readout color array data is read out of the color array memory. The color array data thus read out is used to control the color selector to output therefrom, as a color display control signal, the bit map data of a specified color.

7 Claims, 4 Drawing Sheets

CONTROL METHOD AND APPARATUS THEREFOR

BACKGROUND OF THE INVENTION

The present invention relates to a color display control method and apparatus, for example, for a color liquid crystal panel employing a bit map display system.

For displaying a picture, graphic form, or character on a color liquid crystal panel with regularly arranged red, green and blue dots (i.e. picture elements) through use of a bit map memory assigned addresses corresponding to the dots of the color liquid crystal panel, it is customary in the prior art to employ the following method in the case of providing the display without gradation. When data is written into the bit map memory, the color of the dot of the color liquid crystal panel corresponding to each address of the bit map memory is checked under control of software, and 1 or 0 is written, as the above-mentioned data, into the corresponding address of the bit map memory, depending on whether or not the color of the dot corresponds to the color to be displayed on the color liquid crystal panel (a red dot if the color to be displayed is red and a green or blue dot if the color to be displayed is cyan, for example). The data thus written into the addresses of the bit map memory are read out therefrom in an order corresponding to that in which the dots of the color liquid crystal panel are arranged, and the dots are controlled by the readout data in that order so that each dot is turned ON (lighted) or OFF (held dark) depending on whether the data corresponding thereto is 1 or 0.

The operation for providing a display with gradation is basically the same as mentioned above. When data is written into the bit map memory, the color of the dot of the color liquid crystal panel corresponding to each address of the bit map memory is checked under control of software, and data of plural bits, which indicates the brightness level of the color of the dot, is written into the corresponding address of the bit map memory. The data thus written into the addresses of the bit map memory are read out therefrom in the order corresponding to the order of arrangement of the dots of the color liquid crystal panel, and the dots are each turned ON, in that order, to the brightness based on the corresponding data.

With the conventional color display control method, however, it is necessary to check under control of software the color of the dot of the color liquid crystal panel corresponding to each address of the bit map memory when data is written thereinto as described above. This inevitably necessitates the use of complicated software and retards the processing for color display control.

SUMMARY OF THE INVENTION

It is therefore an object of the present invention to provide a color display control method and apparatus therefor which eliminate the above-mentioned necessity of checking, under control of software, the color of the dot of the color liquid crystal panel corresponding to each address of the bit map memory prior to writing data thereinto, thereby alleviating a burden in terms of software and speeding up the processing for color display control.

According to the color display control method of the present invention for providing an ungradated color display on a color liquid crystal panel, at least red, green and blue bit map memories are prepared each of which has addresses corresponding to at least red, green and blue dots orderly arranged in the color liquid crystal panel and in which one-bit data can be written into each address. Further, a color array memory is prepared which has stored the arrangement of the red, green and blue dots in one or all dot areas of the color liquid crystal panel in terms of the correspondence between addresses of the memory and color data of the dots.

Data is written into each address of an address area of each bit map memory which corresponds to a dot area of the color liquid crystal panel to be illuminated. In this instance, the data differ in content depending on whether the bit map memory corresponds to the color in which the dot area of the panel is to be illuminated. The data thus written into the bit map memories are read out therefrom simultaneously but in an order corresponding to the order of arrangement of the dots of the color liquid crystal panel. In synchronization with this data readout, data, which indicate the colors of the dots of the color liquid crystal panel corresponding to the addresses of the bit map memories from which the data are read out, are sequentially read out from the color array memory as gate signals which are provided on lines corresponding to the colors, respectively. The data read out of the bit map memories are gated by the gate signals corresponding to the bit map memories. The dots of the color liquid crystal panel are lighted in the order of their arrangement under control of the data thus gated.

In the case of providing a gradated color display on the color liquid crystal panel according to the display control method, red, green and blue bit map memories are prepared each of which has addresses corresponding to the regularly arranged red, green and blue dots of the color liquid crystal panel and in which data of plural bits can be written into each address. Further, the same color array memory as mentioned above is prepared.

In this case, plural-bit data indicating the brightness level of the color to which each bit map memory corresponds is written into each address of an address area of the bit map memory which corresponds to a dot area of the color liquid crystal panel to be illuminated. The plural-bit data thus written into the bit map memories are read out in parallel from their addresses at the same time but in an order corresponding to the order of arrangement of the dots of the color liquid crystal panel. In synchronization with this, data, which indicate the colors of the dots of the color liquid crystal panel corresponding to the addresses of the bit map memories from which the data are read out, are sequentially read out from the color arrary memory as gate signals which are provided on lines corresponding to the colors, respectively. The plural-bit data read out of the bit map memories are gated, on a bitwise basis, by the gate signals corresponding to the bit map memories. The dots of the color liquid crystal panel are illuminated in the order of their arrangement under control of the data thus gated.

With the display control method of the present invention, the data which is written into each address of an address area of each bit map memory corresponding to a dot area of the color liquid crystal panel to be illuminated differs in content depending on whether the bit map memory corresponds to the color in which the dot area of the color liquid crystal panel is to be illuminated. Consequently, the same data needs only to be written into the addresses of the address area of the same bit map memory which corresponds to the dot area of the color liquid crystal panel to be lighted. In other words, there is no need of checking, under control of software, the colors of the dots of the color liquid crystal panel corresponding to the addresses of each bit map memory. Thus, the present invention lightens the burden on color display control in terms of software and speeds up the processing for display control.

BRIEF DESCRIPTION OF THE DRAWINGS

FIG. 1A is a diagram schematically illustrating an example of the construction of a color display control device of the present invention for providing a display without gradation;

FIG. 1B is a diagram schematically illustrating an example of a display device to be connected to the color display control device shown in FIG. 1A;

DESCRIPTION OF THE PREFERRED EMBODIMENTS

Figures 1, 1A:
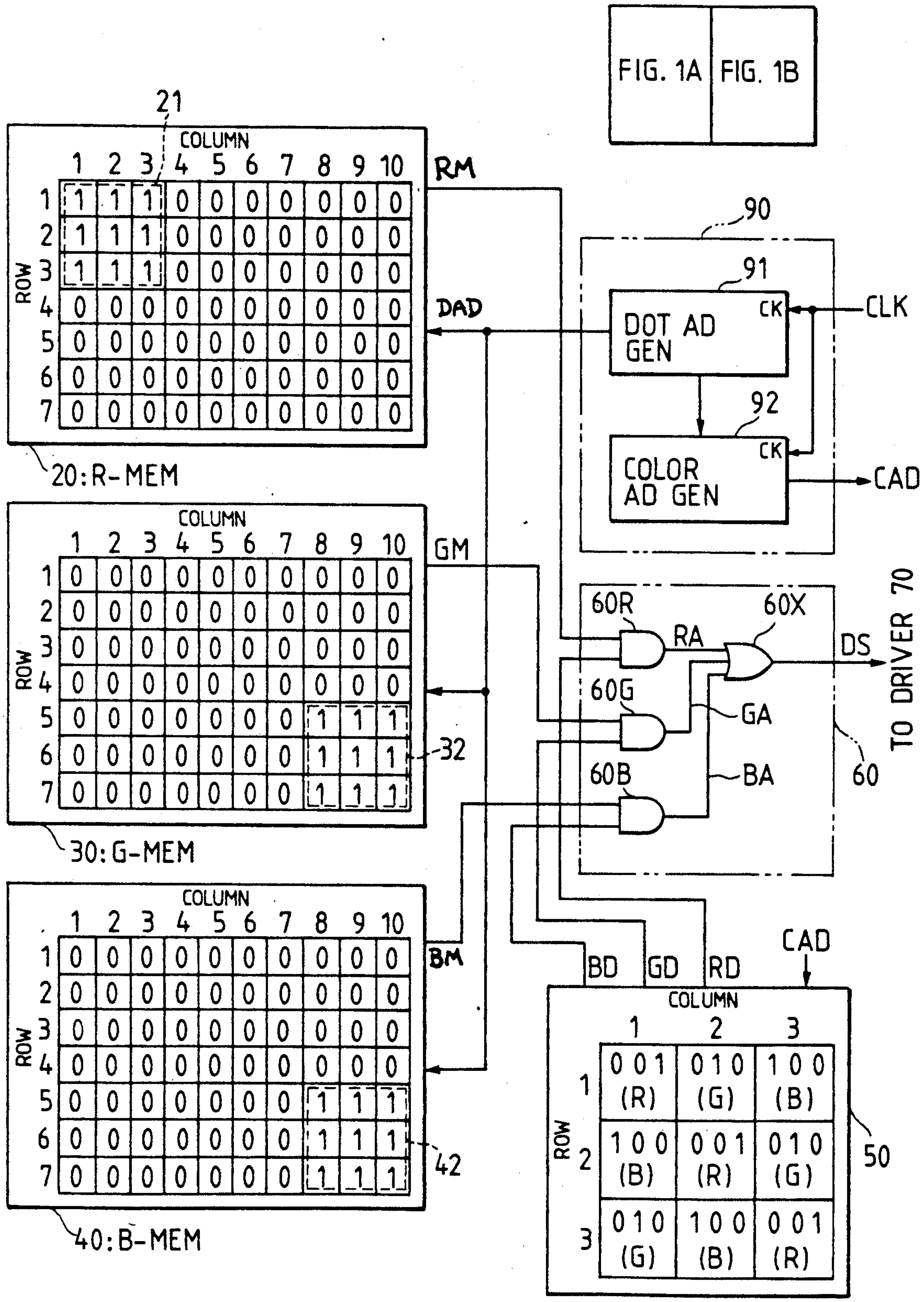
FIG. 1 depicts how
FIGS. 1A and 1B are interconnected.
Figure 1B:
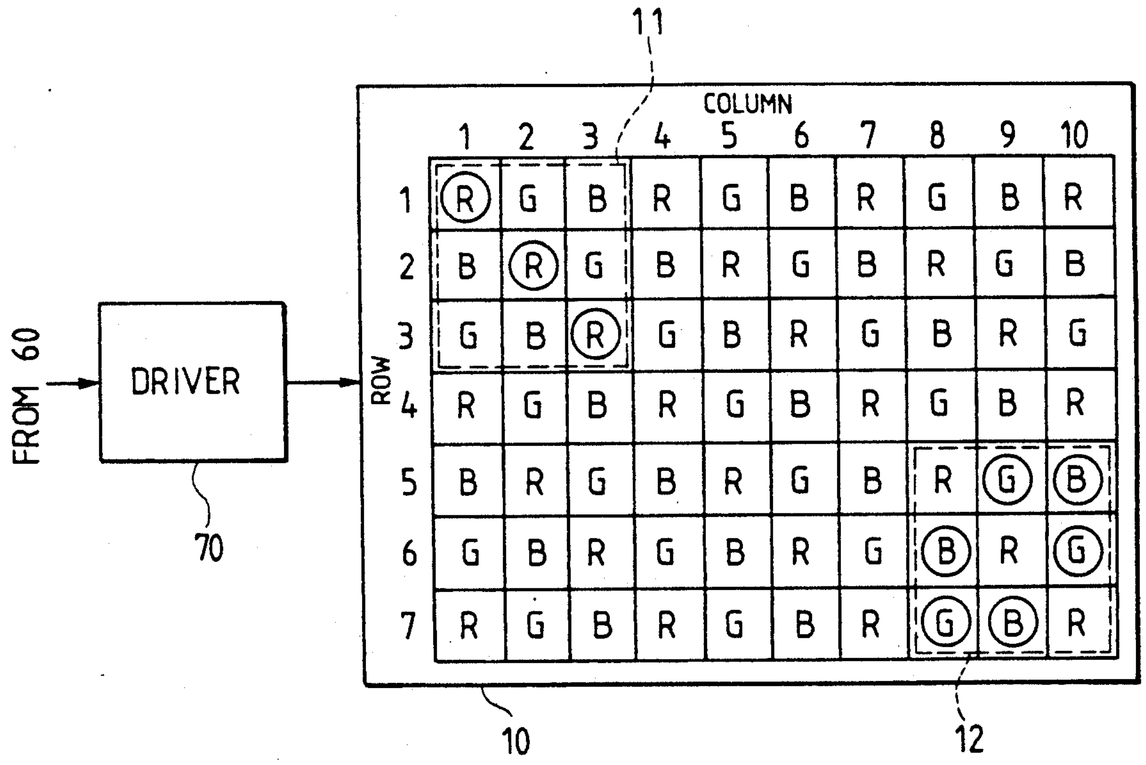

FIG. 1A and 1B together illustrate an example of a device which implements color display control for providing a display without gradation according to the present invention.

A color liquid crystal panel 10 in FIG. 1B has, in this example, red, green and blue dots R, G and B arranged orderly on a diagonal basis. For convenience sake, the panel 10 is shown to have an array of such color dots with 7 rows and 10 columns.

Bit map memories 20, 30 and 40 in FIG. 1A for red, green and blue colors are prepared in association with the color liquid crystal panel 10. For the sake of brevity, the bit map memories 20, 30 and 40 for red, green and blue colors will hereinafter be referred to simply as R-, G-, and B-memories, respectively. The R-, G- and B-memories 20, 30 and 40 are each assigned addresses having a one-to-one correspondence with the dots of the color liquid crystal panel 10. In the interests of clarity of description, each memory is also shown to have an array of addresses with 7 rows and 10 columns. In this example one-bit data can be written into each address of the R-, G- and B-memories.

Further, a color array memory 50 is provided, in which the colors of, for example, nine dots in an area 11 of the color liquid crystal panel 10, composed of dot matrix elements (1, 1) to (3, 3), are prestored in addresses corresponding to the dots, respectively. The color array memory 50 is shown to have an array of addresses with 3 rows and 3 columns so as to facilitate a better understanding of the correspondence between each dot in the area 11 of the color liquid crystal 10 and each address of the color array memory 50. In this example there are written, as shown, in the addresses corresponding to the dots of the color liquid crystal panel 10 three-bit data 001 for the red dots R, 010 for the green dots G, and 100 for the blue dots B, respectively.

In the case of displaying a picture, graphic form, or character on the color liquid crystal panel 10, a first step is to write 1 or 0 into each address of the address area of each of the R-, G- and B-memories 20, 30 and 40 corresponding to the dot area of the color liquid crystal panel 10 to be illuminated, depending on whether the memory corresponds to the color to be displayed in the dot area of the panel 10 to be lighted. Assume, for example, the case of displaying in red the 9-dot area 11 of the color liquid crystal panel 10 composed of the dot matrix elements (1, 1) to (3, 3) and in cyan a 9-dot area 12 composed of dot matrix elements (5, 8) to (7, 10). In this instance, in the R-memory 20 a 1 is written into each address of a 9-address area 21 composed of matrix elements (1, 1) to (3, 3) corresponding to the 9-dot area 11 and 0s are written into the other addresses. In the G- and B-memories 30 and 40 a 1 is written into each address of 9-address areas 32 and 42 composed of matrix elements (5, 8) to (7, 10) corresponding to the 9-dot area 12 of the color liquid crystal panel 10, and 0s are written into the other addresses.

Next, data RM, GM and BM are simultaneously read out of the R-, G- and B-memories 20, 30 and 40 in the order of their addresses corresponding to the order in which the dots are arranged in the matrix form in the color liquid crystal panel 10, that is, the order of dot matrix elements (1, 1) → (1, 2) → (1, 3), → . . . → (1, 10) → (2, 1) → (2, 2) → (2, 3) → (2, 10) → (3, 1) → . . . → (7, 10) in the illustrated example. Addresses DAD for reading out the memories 20, 30 and 40 are sequentially generated by a dot address generator 91 in an address generating unit 90 and are provided to the memories 20, 30 and 40 in common to them.

In synchronization with the readout of the data RM, GM, and BM from the R-, G- and B-memories 20, 30 and 40 data, which indicate the colors of the dots of the color liquid crystal panel 10 corresponding to the addresses of the R-, G- and B-memories 20, 30 and 40 from which the data RM, GM and BM are read out, are sequentially read out of the color array memory 50 as gate signals RD, GD and BD which are provided on lines corresponding to the colors, respectively. In the illustrated embodiment, in the case of sequentially reading out the data RM, GM and BM from the addresses of the elements (1, 1) to (1, 10) of the R-, G- and B-memories 20, 30 and 40, data is cyclically read out of the color array memory 50 in the order of addresses of the elements (1, 1) → (1, 2) → (1, 3) → (1, 1) → (1, 2) → (1, 1)→ . . . . In the case of sequentially reading out the data RM, GM and BM from the addresses of the elements (2, 1) to (2, 10) of the R-, G- and B-memories 20, 30 and 40, data is cyclically read out of the color array memory 50 in the order of addresses of the elements (2, 1) → (2, 2) → (2, 3) → (2, 1) → (2, 2) → (2, 3) → (2, 1) → . . . . In the case of sequentially reading out the data RM, GM and BM from the addresses of the elements (3, 1) to (3, 10) of the R-, G-, and B-memories 20, 30 and 40, the data is cyclically read out of the color array memory 50 in the order of addresses of the elements (3, 1) → (3, 2) → (3, 3) → (3, 1) → (3, 2) → (3, 3) → (3, 1) → . . . . In the case of sequentially reading out the data RM, GM and BM from the addresses of the elements (4, 1) to (4, 10) of the R-, G- and B-memories 20, 30 and 40, the data is cyclically read out of the color array memory 50 in the order of addresses of the elements (1, 1) → (1, 2) → (1, 3) → (1, 1) → (1, 2) → (1, 3) → (1, 1) → . . . . In the case of sequentially reading out the data RM, GM and BM from the addresses of the elements (5, 1) to (5, 10) of the R-, G- and B-memories 20, 30 and 40, the data is cyclically read out of the color array memory 50 in the order of addresses of the elements (2, 1) → (2, 2) → (2, 3) → (2, 1) → (2, 2) → (2, 3) → (2, 1) → . . . . In this way, the aforementioned 3-bit data are read out in parallel from the color array memory 50, and the least significant, second and most significant bits of the 3-bit data are taken out as the gate signals RD, GD and BD, respectively. Addresses CAD for cyclically reading out the color array memory 50 are created by a color address generator 92 in the address generating unit 90.

The data RM, GM and BM read out of the R-, G- and B-memories 20, 30 and 40 are provided to AND gates 60R, 60G and 60B, respectively, which form a color selector 60. The gate signals RD, GD and BD available from the color array memory 50 are also applied to the AND gates 60R, 60G and 60B, respectively. Output data RA, GA and BA of the AND gates 60R, 60G and 60B are provided to an OR gate 60X. Output data of the OR gate 60X, that is, a color display control signal DS which is the output of the color display control device of the present invention, is applied to a driver 70 for the color liquid crystal panel 10. In synchronization with the readout of the data RM, GM and BM from the R-, G- and B-memories 20, 30 and 40 the dots of the color liquid crystal panel 10 are driven by the drier 70 in the order of the elements (1, 1) → (1, 2) → (1, 3) → . . . → (1, 10) → (2, 1) → (2, 2) → (2, 3) → . . . → (2, 10) → (3, 1) → . . . so that the dots are each lighted or held dark depending on whether the output data DS of the color selector 60 is 1 or 0 at that time.

As a result, in the above example the red dots R of the elements (1, 1), (2, 2) and (3, 3) in the area 11 of the color liquid crystal panel 10 are lighted and the green dots G of the elements (5, 9), (6, 10) and (7, 8) and the blue dots B of the elements (5, 10), (6, 8) and (7, 9) in the area 12 are lighted, displaying the area 11 in red and the area 12 in cyan.

Figure 2:
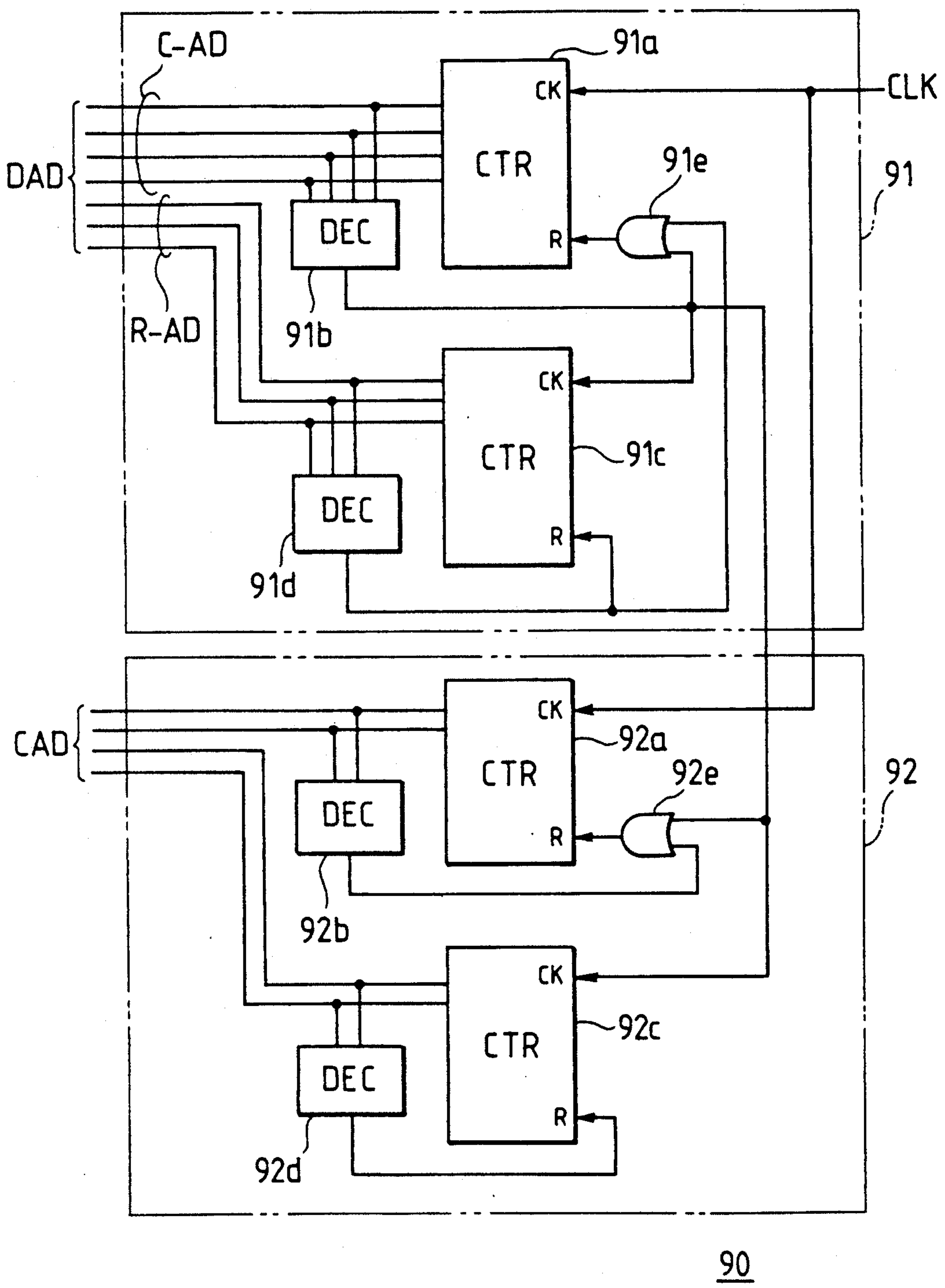
FIG. 2 is a diagram schematically showing an example of the construction of an address generating unit 90 used in the apparatus depicted in FIG. 1A.

FIG. 2 illustrates an example of the construction of the address generating unit 90 employed in the embodiment of FIG. 1. The dot address generator 91 comprises: a column counter 91*a* which counts clock signals CLK supplied thereto from the outside; a decoder 91*b* which decodes the count output of the column counter 91*a* and, when its count value reaches a predetermined value, outputs an "H" level; a row counter 91*c* which counts the output of the decoder 91*b*; a decoder 91*d* which decodes the counter output of the row counter 91*c* and, when its count value reaches a predetermined value, outputs an "H" level; and an OR gate 91*e* which is connected to a reset terminal R of the column counter 91*a*. In the case of accessing the memories 20, 30 and 40 each having an array of addresses with 7 rows and 10 columns, the decoders 91*b* and 91*d* yield "H" levels upon each detection of count values 10 and 7, respectively, and these "H" level outputs are provided as reset signals to the reset terminals R of the column and row counters 91*a* and 91*c*, resetting them. The output of the decoder 91*d* is also applied to the reset terminal R of the column counter 91*a* via the OR gate 91*e*. Accordingly, the column counter 91*a* and the decoder 91*b* constitute a decimal counter whereby column addresses C-AD are generated in a repeating cyclic order, and the row counter 91*c* and the decoder 91*d* constitute a septimal counter whereby row addresses R-AD are generated in a repeating cyclic order.

The color address generator 92 also comprises a column counter 92*a*, a decoder 92*b*, a row counter 92*c*, a decoder 92*d*, and an OR gate 92*e*. For cyclically accessing the color array memory 50 having an array of addresses with 3 rows and 3 columns, a pair of counter 92*a* and decoder 92*b* and a pair of counter 92*c* and decoder 92*d* each constitute a ternary counter. The column counter 92*a* counts the clock signals CLK and the row counter 92*c* counts the output of the decoder 91*b* in the dot address generator 91. The output of the decoder 91*b* is also applied as a reset signal to a reset terminal R of the column counter 92*a* via the OR gate 92*e*.

The color array memory 50 may also be formed to have only three addresses of the elements (1, 1) to (1, 3) shown in FIG. 1A and read out in such a manner as follows. When the data RM, GM and BM are sequentially read out from the addresses of the elements (1, 1) to (1, 10) of the R-, G- and B-memories 20, 30 and 40, data stored in the color array memory 50 is cyclically read out from the address of the element (1, 1). When the data RM, Gm and BM are sequentially read out from the addresses of the elements (2, 1) to (2, 10) of the R-, G- and B-memories 20, 30 and 40, data stored in the color array memory 50 is cyclically read out from the address of the element (1, 2). When the data RM, GM and BM are sequentially read out from the addresses of the elements (3, 1) to (3, 10) of the R-, G- and M-memories 20, 30 and 40 data stored in the color array memory 50 is cyclically read out from the address of the element (1, 3). Similarly, when the data RM, GM and BM are sequentially read out from the addresses of the elements (4, 1) to (4, 10), (5, 1) to (5, 10), (6, 1) to (6, 10) and (7, 1) to (7, 10) of the R-, G- and B-memories 20, 30 and 40, data stored in the color array memory 50 is cyclically read out from the addresses of the elements (1, 1), (1, 2) and (1, 3), respectively. Furthermore, the color array memory 50 may be formed to have the same array of addresses as those of the R-, G- and B-memories 20, 30 and 40. In this instance, the color array relationship of all the dots in the color liquid crystal panel 10 is prestored in the color array memory 50, from which the data is read out in the same manner as that of the readout of the data RM, GM and BM from the R-, G- and B-memories 20, 30 and 40.

Incidentally, in the case of employing a color liquid crystal panel which has each or unit dot area composed of four dots including one red, one blue and two green dots or one red, one blue, one blue and one yellow dot, four bit map memories are used each of which has addresses corresponding to the dots of the color liquid crystal panel, and a color array memory is used which prestores the color array relationship of the four dots of at least one dot area of the color liquid crystal panel.

Figure 3:
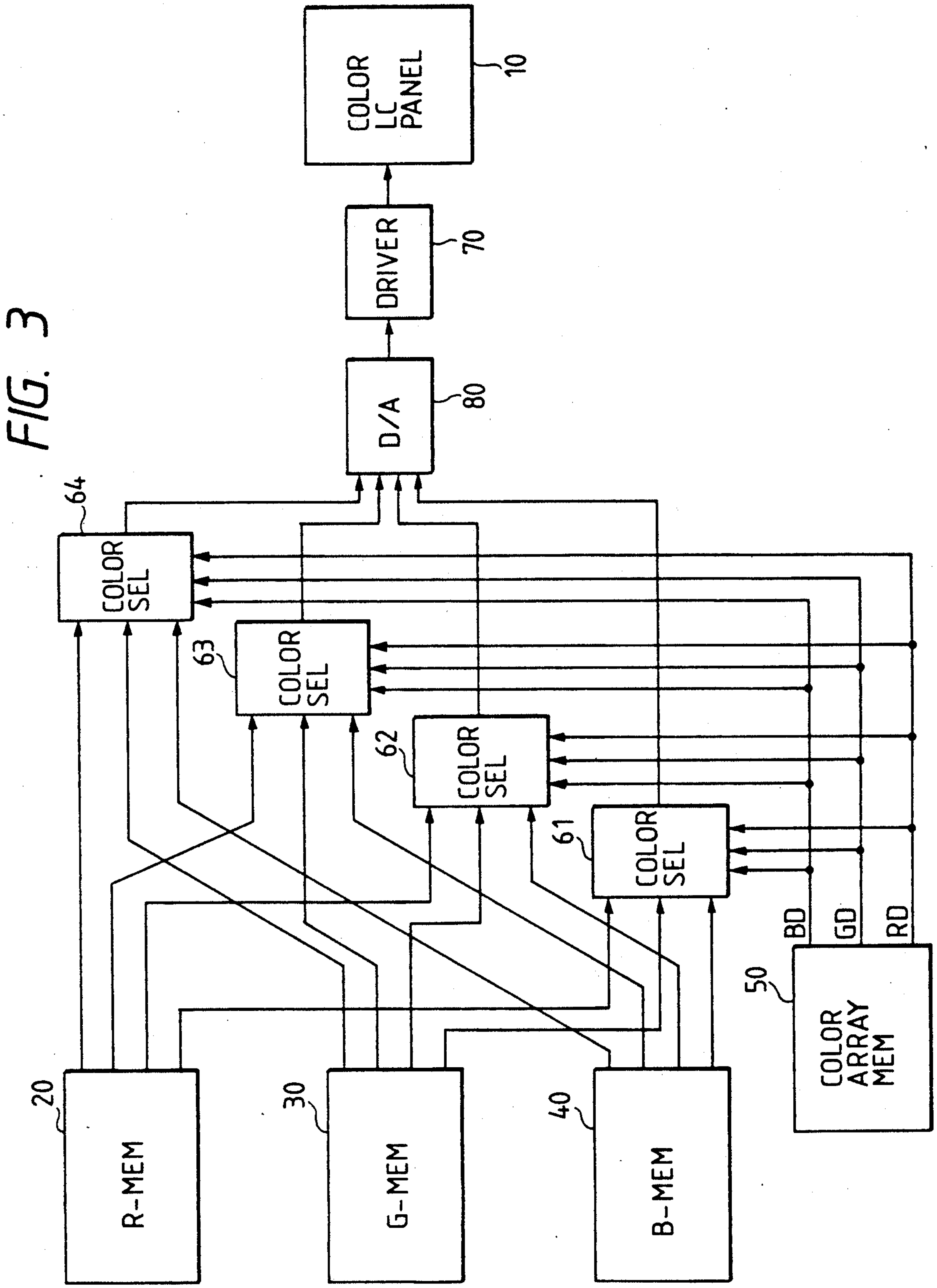
FIG. 3 is a diagram schematically illustrating, together with the display device, an example of the construction of the color display control device of the present invention for providing a display with gradation.

FIG. 3 illustrates another embodiment of the device of the present invention which performs display control for gradated color display.

The color liquid crystal panel 10 is identical with that used in the above embodiment. The R-, G- and B- memories 20, 30 and 40 are also identical in address assignment with those in FIG. 1A but adapted to permit data of plural bits, for example, four bits, to be written into each address. The color array memory 50 is identical with that in FIG. 1A. No address generating unit is shown.

Four-bit data indicating the brightness levels for red, green and blue colors are written into addresses of those address areas of the R-, G- and B-memories 20, 30 and 40 which correspond to the dot area of the color liquid crystal panel 10 to be illuminated. Four-bit data 0000, which indicates that the brightness level is zero, is written into the other addresses of the R-, G- and B-memories 20, 30 and 40. After this, data are read out of the R-, G- and B-memories 20, 30 and 40 and the color array memory 50 in the same manner as described previously with respect to FIG. 1A. In this instance, however, the 4-bit data are read out in parallel from the R-, G- and B-memories 20, 30 and 40.

The least significant bits, second-order bits, third-order bits and the most significant bits of the 4-bit data thus read out of the R-, G- and B-memories 20, 30 and 40 are provided to color selectors 61, 62, 63 and 64, respectively. The gate signals RD, GD and BD available from the color array memory 50 are applied to the color selectors 61 to 64. The color selectors 61 to 64 are identical with that used in FIG. 1A. Four-bit data, which is composed of output data of the color selectors 61, 62, 63 and 64 as the least significant, second-order, third-order and the most significant bits, respectively, is applied to a D/A converter 80 for conversion into an analog voltage, which is provided as a drive voltage to the driver 70 for the color liquid crystal panel 10. Thus, in synchronization with the data readout from the R-, G- and B-memories 20, 30 and 40 the dots of the color liquid crystal panel 10 are lighted under control of the driver 70, in the order of their arrangement, to the brightness corresponding to the output voltage of the D/A converter 80.

As described above, according to the present invention, there is no need of determining, on a software basis, the colors of dots of the color crystal panel corresponding to addresses of the bit map memories when data is written thereinto. This alleviates the burden on the color display control in terms of software and speeds up the processing for display control.

It will be apparent that many modifications and variations may be effected without departing from the scope of the novel concepts of the present invention.

What is claimed is:

1. A color display control method for a color display panel which has regularly arranged dots of plural kinds of colors and is associated with bit map memories which correspond to said plural kinds of colors, respectively, and have addresses corresponding to said dots of said color display panel and in which bit map data of one bit can be written into each of said addresses, and a color array memory which has prestored color array data indicating the arrangement of said dots of said plural kinds of colors in one or all dot areas of said color display panel, said method comprising:

a step wherein said bit map data is written into each address of an address area of each of said bit map memories which corresponds to a dot area of said color display panel to be illuminated, said bit map data differing in content depending on whether said each bit map memory corresponds to the color in which said dot area of said color display panel is to be illuminated;

a step wherein said bit map data written into said bit map memories are read out therefrom simultaneously but in an order corresponding to the order in which said dots of said color display panel are arranged;

a step wherein, in synchronization with the readout of said bit map data, said color array data, which indicate the colors of said dots of said color display panel corresponding to said addresses of said bit map memories from which said bit map data are read out, are sequentially read out of said color array memory, as gate signals which are provided on lines corresponding to said plural kinds of colors; and a step wherein said bit map data read out of said bit map memories are gated by said gate signals corresponding to said bit map memories, respectively, and said dots of said color display panel are lighted in the order of their arrangement under control of said gated bit map data.

2. A color display control method for a color display panel which has regularly arranged dots of plural kinds of colors and is associated with bit map memories which correspond to said plural kinds of colors, respectively, and have addresses corresponding to said dots of said color display panel and in which bit map data of plural bits, indicating gradation, can be written into each of said address, and a color array memory which has prestored color array data indicating the arrangement of said dots of said plural kinds of colors in one or all dot areas of said color display panel, said method comprising:

a step wherein aid bit map data of plural bits indicating the gradation of the color to which each of said bit map memories corresponds is written into each address of an address area of said each bit map memory corresponding to a dot area of said color display panel to be illuminated;

a step wherein said bit map data of plural bits written into said bit map memories are read out in parallel from their addresses simultaneously but in an order corresponding to the order of arrangement of said dots of said color display panel;

a step wherein in synchronization with the readout of said bit map data of plural bits, said color array data, which indicate the colors of said dots of said color display panel corresponding to said addresses of said bit map memories from which said bit map data of plural bits are read out, are sequentially read out of said color array memory, as gate signals which are provided on lines corresponding to said plural kinds of colors; and a step wherein said bit map data of plural bits read out of said bit map memories are gated, on a bitwise basis, by said gate signals corresponding to said bit map memories, respectively, and said dots of said color display panel are lighted in the order of their arrangement under control of said gated bit map data of plural bits.

3. A color display control device for a color display panel which has regularly arranged dots of plural kinds of colors, comprising:

a plurality of bit map memories each of which is provided corresponding to one of said plural kinds of colors and has addresses corresponding to dots of said color display panel and in which bit map data of at least one bit can be written into each of said addresses;

a color array memory in which color array data indicating the color of each of said dots in at least one dot area of said color display panel has been written in an address corresponding to said each dot;

address generating means which generates dot addresses by which, as said dots of said color display panel are sequentially scanned, said bit map data are read out of said addresses of said bit map memories corresponding to said dots being scanned, and which generates color addresses for reading out said color array data from said addresses of said color array memory corresponding to said dots being scanned; and color select means which is supplied with said bit map data read out of said bit map memories and selectively outputs that one of said bit map data which was read out from that one of said plurality of bit map memories which is specified by said color array data read out of said color array memory.

4. The color display control device of claim 3, wherein the number of said plural kinds of colors is three and the number of said bit map memories is three.

5. The color display control device of claim 3, wherein said color select means includes a plurality of gates connected to the outputs of said bit map memories, respectively, and means for combining the outputs of said gate into a color control signal, and wherein said gates are each enabled and disabled by that one of bits of said color array data read out of said color array memory which corresponds to each of said gates.

6. The color display control device of claim 4, wherein said color array memory has a three-by-three array of addresses in each of which three-bit color array data has been written, and wherein said color select means includes three AND gates connected at one input to the outputs of said three bit map memories and at the other input to a three-bit output of said color array memory, and an OR gate connected to the outputs of said three AND gates.

7: The color display control device of claim 3, 4, 5, or 6, wherein bit map data of plural bits indicating gradation is prestored in each address of each of said bit map memories, and wherein said color select means is provided corresponding to each bit of said bit map data, each color select means being connected to those of the pluralities of bit outputs of said plurality of bit map memories which correspond to said each color select means, and said plurality of color select means are selectively controlled by common color data read out of said color array memory and output plural-bit data indicating said gradation.

* * * * *